3,378,527
ESTER ETHER-ACETAL COPOLYMERS AND PROCESS OF PREPARING SAME
Leslie C. Case and Laura K. Case, both of 14 Lockland Road, Winchester, Mass. 01890
No Drawing. Continuation-in-part of application Ser. No. 168,062, Jan. 23, 1962. This application Sept. 8, 1966, Ser. No. 578,425
62 Claims. (Cl. 260—67)

---

ABSTRACT OF THE DISCLOSURE

Ternary copolymers containing ester, ether, and aectal units and having chemically reactive hydroxyl or carboxyl chain-end groups are described. Two general types of ternary copolymers are provided, one containing the ester, ether, and acetal units in random sequences, the other containing polyacetal blocks terminated and/or linked together by ester-ether copolymer segments. The first type of terpolymer is prepared by reacting together an aldehyde, a cyclic anhydride of an organic dicarboxylic acid and an epoxide or oxetane, and, preferably, a starter with active hydrogen-containing radicals. The second type of terpolymer is prepared by employing a hydroxyl-terminated polyacetal as the starter.

---

This application is a continuation-in-part of applications Ser. No. 168,062, filed Jan. 23, 1962, now abandoned, Ser. No. 212,466, filed July 25, 1962, now abandoned, and Ser. No. 456,816, filed May 18, 1965.

This invention is concerned with novel polymeric compositions and their production. More particularly, this invention is concerned with novel ternary copolymers related to the classes broadly referred to as condensation and addition polymers, and having ester, ether, and acetal linkages in substantial proportion, and with the novel processes of producing such materials.

It is a principal object of the present invention to provide novel hydroxyl- or carboxyl-terminated ternary copolymeric compositions having main polymer chains composed of a multiplicity of ester, ether, and acetal members, and to provide a novel process for producing such compositions starting with readily available low-priced monomers. The ternary compositions provided may be random copolymers in which these members are distributed substantially randomly within the polymer chains, or they may be ordered, so-called block copolymers, in which blocks or segments of recurring acetal members derived from a preformed polyacetal block alternate with blocks of a random binary polyester-ether copolymer. It is a further object to provide such compositions over a wide range of molecular weights in a fusible, soluble thermoplastic form, or in a cross-linked thermosetting form. It is a still further object to provide compositions which may be monofunctional or polyfunctional, that is, the polymer chains may carry one or several functional groups capable of entering into constructive chemical reaction, if desired.

It is yet another object of this invention to prepare conveniently and economically fire-resistant polymers of the above type. A still further object of this invention is to provide unsaturated copolymers with improved color.

It has been found that aldehydes will react with cyclic ethers selected from the group consisting of epoxides and oxethanes, and organic polycarboxylic acid anhydrides to form ternary copolymers. It has further been discovered that the polymerization is greatly improved and that more desirable compositions are obtained if a polymerization starter having an active-hydrogen-containing radical is employed. Anhydrides which are much preferred for use are cyclic anhydride of polycarboxylic acids, and particularly cyclic anhydrides of dicarboxylic acids. Linear polyanhydrides of dicarboxylic acids may be employed but are less reactive and lead to undesirable broadening of the polymer molecular weight distribution.

In accord with the present invention novel polymeric products are produced by reacting together (1) a cyclic ether selected from the group consisting of epoxides and oxetanes, (2) a cyclic anhydride of an organic polycarboxylic acid, and (3) an aldehyde, at a temperature of about 70° C. to about 225° C. sufficient for the reactants to polymerize and at a pressure at least equal to the vapor pressure of the system at the reaction temperature.

According to the preferred embodiment of the invention, the preferred polymeric compositions are produced by reacting together (1) a cyclic ether selected from the group consisting of epoxides and oxetanes, (2) a cyclic anhydride of an organic polycarboxylic acid, (3) an aldehyde, and (4) a polymerization starter of the group consisting of water, inorganic acids capable of effecting a ring-opening reaction of cyclic ethers, and organic compounds with active-hydrogen-containing radicals selected from the group consisting of hydroxyl, carboxyl, sulfhydryl, and amino radicals at a temperature of about 70° C. to about 225° C. sufficient for the reactants to polymerize, and at a pressure at least equal to the vapor pressure of the system at the reaction temperature.

If only difunctionally reactive cyclic monoethers, cyclic monoanhydrides and monoaldehydes are employed with or without the above described polymerization starters, non-cross-linked, fusible, soluble, thermoplastic random copolymers which are linear or branched with substantially linear main polymer chains are obtained. Each polymer molecule is mono-, di-, or higher polyfunctional and has terminal carboxylic acid groups or hydroxyl groups. If multifunctional reactants, such as diepoxides, triepoxides, or higher polyepoxides, or dianhydrides, or dialdehydes, are coreacted with monoethers, monoanhydrides, and monoaldehydes, in the absence or presence of a polymerization starter, the resulting copolymers will be more highly branched, and if a sufficient proportion of these multifunctional reactants is employed, a cross-linked, infusible, insoluble composition results.

The ternary copolymers resulting from the process of this invention are produced by an addition mechanism, but have the formal structure and characteristics of condensation polymers. Polymerization by the above process proceeds by random stepwise addition and the polymeric products have ester, ether, and acetal units interspersed more or less at random along the polymer chains. The number of the various units in the ternary copolymers is distributed more or less according to a Poisson distribution, such as:

-Y-XX-Z-Y-ZZ-Y-X-Y-Z-Y-X-Z-XXX-ZZ-Y-XXXX-Z-

Where:

X=(—O—R—) is a 1,3- or 1,4-oxyalkylene radical derived from a cyclic ether by a ring-opening reaction, and R is a 1,2-alkylene or 1,3-alkylene radical

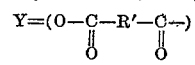

is a residue derived from a cyclic anhydride by a ring-opening reaction, and R' is a hydrocarbon radical connecting two carboxylic acid carbonyl functions

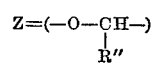

is an acetal unit and R" is a radical attached to the carbon atom of the aldehyde group.

The most interesting compounds are those in which R is a lower alkylene such as 1,2-ethylene, 1,2-propylene and 1,2-butylene; R' is 1,2-phenylene, a lower alkylene and especially ethylene, a lower alkene and particularly ethenylene (—CH=CH—), and the hexachlorobicycloheptylene group, and R" is hydrogen, methyl and trihalomethyl.

The polymeric compositions provided herewith are broadly described as random polyester-ether-acetal copolymers since they contain a multiplicity of ester, ether, and acetal linkages distributed in a random fashion within the polymer chain. The term random is used to differentiate these polymers from so-called block polymers or polymers with a repeating sequence of identical structural segments in the polymer chain. While the overall structure of the ternary copolymers of the present invention can best be described as random it should be noted that the sequences of the individual respective linkages in the polymer chain are not precisely random in that only certain sequences of linkages may be present. As a polymer chain is traversed certain limitations apply to the sequential order in which the linkages appear. Specifically, it will be understood by those skilled in the art that the ester linkages always are present in pairs, separated by the hydrocarbon radical which connected the carboxylic carbonyl groups of the original anhydride, and such a pair of ester linkages is usually separated by one or more ether or acetal units from a second pair of ester linkages derived from another anhydride molecule. The ether linkages may occur either singly or in runs with the length of each run containing from two to about fifteen cyclic ether units in the main chain and frequently being as much as three or four, rarely being as much as 8 or 10, and very rarely exceeding fifteen. Thus the polymer chain will contain polyether segments composed of a mixture of monooxyalkylene, dioxyalkylene, trioxyalkylene, and higher polyoxyalkylene units. The acetal members may also occur singly or in runs with the acetal units in each run ranging from two to about 25, and more commonly from two to about fifteen, and frequency from about two to ten. An acetal unit or segment may be adjacent to either an ether or an ester unit.

If the reactants with the exception of the polymerization starter are difunctionally reactive only, that is, if the ternary copolymers are prepared by reacting together (1) a cyclic monoanhydride of an organic polycarboxylic acid, (2) a cyclic monoether selected from the group consisting of monoepoxides and monooxetanes, and (3) a monoaldehyde, with a polymerization starter as described herein-above, thermoplastic fusible, soluble, random ternary copolymers are produced which consist of linear main polymer chains composed of polyoxyalkylene segments of the general formula (—O—R—)$_n$, anhydride residues of the formula

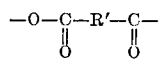

and acetal segments of the formula

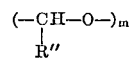

wherein R, R', and R" have the above assigned meaning, and $m$ and $n$ are positive whole numbers varying from one to about fifteen, with the average value ranging from about 1.25, to not more than eight, and generally not more than six and frequently not more than four, said polymer chains originating at one end in a branch-like or tentacular fashion from, and being attached through ester or ether linkages to, the polymerization starter residue which provides a central core, and with said chains being terminated at the other end by a hydroxyl or carboxylic acid end group. The functionality of the polymer, that is, the number of hydroxyl or carboxyl end groups per polymer molecule, will be equal to the functionality of the polymerization starter under these conditions. A polymerization starter with only one active-hydrogen-containing group will give rise to a polymer molecule composed of a single polymer chain terminated by a hydroxyl or carboxyl group; a difunctional starter, such as a glycol, for example, will produce compositions composed of polymer molecules having two polymer chains emanating from the starter residue with each chain having either a hydroxyl or a carboxyl end group, and with a trifunctional starter, such as glycerol, for example, the ternary copolymer will consist of polymer molecules having three hydroxyl- or carboxyl-terminated polymer chains attached to the starter. The functionality of the polymer is thus determined by the functionality of the starter employed in combination with the monoepoxide, the monoanhydride and the monoaldehyde.

Such random thermoplastic terpolymers produced from cyclic monoethers, cyclic monoanhydrides, monoaldehydes and a polymerization starter may be represented by the general structural formula:

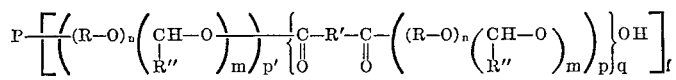

wherein R, R' and R" have the above-assigned meaning, P is the residue of a polymerization starter of functionality $f$, $n$ is an integer varying from zero to about ten, and preferably from zero to about five, and having an average value of from about 1.25 to about 6, $m$ is an integer varying from zero to about fifteen with the average value of $m$ ranging from about 1.25 to eight, and with the sum of $n$ plus $m$ between ester linkages being at least 1.0, $p$ is an integer equal to or larger than one and $p'$ is an integer equal to or larger than zero, $q$ is an integer varying from zero to about fifty, with an average value of at least about one.

Desirable copolymers will contain from at least 0.1 to not more than 50 percent and more commonly from about one to about 25 percent by weight of residues derived from the polymerization starter and from about one to about 75 percent and preferably from about 5 to 50 percent by weight of acetal units

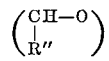

with the remainder of the weight being composed of cyclic ether residues and anhydride residues in a proportion such that the molar ratio R to R' will range from about 1.5, and preferably from about 2, to not more than ten, and preferably to less than six. Cross-linked ternary compositions will generally contain from about 0.1 to 25 percent by weight of starter residues and from about 5 to 50 percent by weight of acetal units with the remainder of the weight being cyclic ether residues and anhydride residues in a molar ratio of R/R' from about 1.5 to about 6, and with at least 2 percent, and usually at least five percent by weight of the total composition being derived from polyfunctional monomers with a functionality of at least four.

The cyclic ethers which can be used in this invention comprise 1,2-alkylene oxides, also known as epoxides or oxiranes, and 1,3-alkylene oxides, also known as oxetanes. The cyclic ethers may carry substituents which do not interfere with the polymerization, such as, for example, alkyl, alkylene, alkoxy, carbalkoxy, halogen radicals, and the like. Particularly suitable cyclic ethers are those having from two to twenty carbon atoms and from zero to 3 halogen atoms such as chloro or bromo radicals. Especially preferred for use in the present invention are the saturated aliphatic terminal 1,2-monoepoxides having from 2 to not more than ten, and advisably not more than six carbon atoms, and having the general structural formula

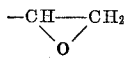

wherein the residual valence may be satisfied by hydrogen or by a radical selected from the group consisting of alkyl, cycloalkyl, aryl, alkaryl, and aralkyl radicals, and substituted such radicals, such as haloalkyl, alkylene, etc.

Representative of the terminal epoxides which can be used are ethylene oxide, propylene oxide, 1,2-butylene oxide, 1,2-hexylene oxide, styrene oxide, and epoxides derived from epoxidation of linear olefines, such as for example octadecene-1,2-epoxide. Examples of useful substituted epoxides are epichlorohydrin, epibromohydrin, allyl glycidyl ether, butadiene monoxide, vinyl-cyclohexene monoxide, ethyl epoxy oleate, glycidyl acrylate, glycidyl methacrylate, ethyl glycidyl ether, methyl glycidyl ether, and epoxides derived from terpenes by epoxidation such as pinene epoxide. In some instances glycidol is also useful.

Internal epoxides, such as 2,3-butylene epoxide may also be used although they may react at a somewhat slower rate and require longer reaction times.

Useful four-membered cyclic ethers comprise oxetanes and substituted oxetanes. Especially useful are oxetanes having from 3 to 6 carbon atoms and from zero to 3 halogen atoms selected from the class of chloro and bromo radicals. Examples of useful four-membered cyclic ethers are trimethylene oxide or oxetane itself, and substituted oxetanes, such as 2-methyl oxetane, 3-methyl oxetane, 3,3-dimethyl oxetane, 2,4-dimethyl oxetane, 3,3 - bis - (chloromethyl) - oxetane, and 3,3-bis-(bromomethyl)-oxetane.

The most preferred cyclic ethers for use in the invention are ethylene oxide and propylene oxide. Both of these are very reactive and are readily available. Mixtures of cyclic ethers may be employed and are frequently useful.

Multifunctional epoxides, having more than one epoxy group, may be employed in admixture with monoethers if partially or completely cross-linked compositions are desired. Diepoxides of 4 to 21 carbon atoms are especially useful in combination with monoepoxides for this purpose. Representative useful polyepoxides are vinyl-cyclohexene dioxide, dicyclopentadiene diepoxide, butadiene diepoxide, epoxymethylcyclohexylmethyl(epoxymethylcyclohexylcarboxylate), epoxidized polybutadiene, epoxidized soybean oil, epoxidized linseed oil, glycidyl ethers of glycerol, bisphenol A-diglycidyl ether, butylene glycol diglycidyl ether, alloocimene dioxide, and similar materials.

The anhydrides which are contemplated for use in the present invention are cyclic anhydrides, e.g. those having the structural group

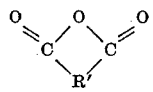

Both mono- and polycyclic anhydrides of organic polycarboxylic acids which are capable of forming a cyclic anhydride can be used in the process, and they can be aromatic, alicyclic, or aliphatic saturated or partially saturated anhydrides. Such anhydrides having from four to fourteen carbon atoms and from zero to six chloro or bromo substituents are especially useful, e.g. in which R' is a hydrocarbon radical having from 2 to 12 carbon atoms and from zero to six chloro or bromo substituents. The use of cyclic monoanhydrides is particularly preferred. Especially those derived from 1,2-dicarboxylic acids are very suitable. Those anhydrides which are presently considered most useful in the process are phthalic anhydride, maleic anhydride, succinic anhydride, and 3, 4,5,6 - tetrachlorophthalic anhydride. Examples of other cyclic anhydrides which are useful are 3,4,5,6-tetrahydrophthalic anhydride, 3,4,5,6 - tetrabromophthalic anhydride, hexahydrophthalic anhydride, 1,4,5,6,7,7-hexachlorobicyclo - (2,2,1) - 5 - heptene - 2,3 - dicarboxylic acid anhydride, hereinafter called Chlorendic anhydride, itaconic anhydride, glutaric anhydride, diglycollic acid anhydride, and 2,2'-diphenyl dicarboxylic acid anhydride, hereinafter called diphenic anhydride.

Examples of useful cyclic polyanhydrides are trimellitic anhydride and pyromellitic anhydride.

The halogenated anhydrides are useful for the preparation of polymers with self-extinguishing properties. It is to be understood that cyclic anhydrides other than those named can be used in the process. Also, a single anhydride, or mixtures thereof, can be used.

Linear polycarboxylic acid anhydrides, such as polyadipic polyanhydride, polyazelaic polyanhydride, and polyisophthalic polyanhydride and polyterephthalic anhydride can be employed, but their lower reactivity, higher cost and broadening effect on the polymer molecular weight distribution makes their use less desirable.

Both mono- and polyfunctional aldehydes can be used in the process, and they can be aliphatic, alicyclic, aromatic or heterocyclic in nature. Both saturated and unsaturated aldehydes are useful. The lower aliphatic aldehydes (which includes formaldehyde) and the phenyl-substituted lower aliphatic aldehydes appear most suitable. Lower alkanals, lower alkenals, lower alkynals, phenyl-lower alkanals and phenyl-lower alkenals are subgeneric groups of aldehydes of especial interest in this invention. Preferred are those aldehydes having from one to 12 carbon atoms and from 0 to 3 halogen substituents such as chloro- or bromo radicals. Aldehydes which are at present considered to be particularly useful in the process are formaldehyde, acetaldehyde, benzaldehyde, trimethylacetaldehyde, terephthaldialdehyde, trichloroacetaldehyde, hereinafter called chloral, and tribromoacetaldehyde, hereinafter called bromal, as well as acrolein, crotonaldehyde and cinnamylaldehyde. Examples of other useful aldehydes include propionaldehyde, butyraldehyde, 2-ethyl hexaldehyde, isobutyraldehyde, isodecaldehyde, methacrolein, and tetrahydrofurfuraldehyde.

Monomeric aldehydes are preferred for use as reactants. The aldehyde component may be introduced in the form of the cyclic aldehyde polymer, such as trioxane or paraldehyde, but it is not known whether the aldehyde reacts in this polymeric form or whether dissociation to the monomeric aldehyde takes place under the reaction conditions.

Especially preferred for use in the present invention are the lower aliphatic aldehydes having from one to six carbon atoms and from zero to 3 halogen atoms. These aldehydes are more reactive than the higher molecular weight aldehydes and combine more readily. Chloral and bromal are particularly useful in the production of polymers with flame retardant properties because of their high halogen content, and their low cost.

Since the nomenclature applying to aldehydes and aldehyde polymers is not universally standardized, it should be noted that we have herein employed the nomenclature used in "Formaldehyde" by J. F. Walker, Reinhold Publishing Co. According to this reference, paraformaldehyde, or paraform, is a mixture of linear polyoxymethylene glycols containing 91%–99% formaldehyde and generally has the formula $HO-(CH_2-O)_n-H$ with $n$ in the range of about 8–100. Also, in this reference the cyclic trimer of formaldehyde is called trioxane or trioxymethylene while the cyclic trimer of acetaldehyde is paraldehyde.

The use of formaldehyde as a comonomer together with an unsaturated anhydride, such as maleic anhydride, and a lower alkylene oxide is particularly advantageous in preparing polymers with improved color.

If the cyclic ether, the cyclic anhydride and the aldehyde are reacted together in the absence of a polymerization starter, aldehydes having at least one hydrogen atom on the carbon atom next to the aldehyde group, e.g. those aldehydes having the skeletal structural formula

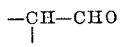

where the residual valences may be satisfied by hydrogen or hydrocarbon radicals, should advisably be employed to obtain satisfactory reactivity.

If difunctional aldehydes, such as terephthaldialdehyde, are used as comonomers, then the resulting polymers are branched, and if a sufficient amount of these multifunctional reactants is used, a cross-linked infusible product results. Similarly, multifunctional epoxides or dianhydrides may also be used as desired to yield branched or cross-linked products.

Since the reaction of the cyclic anhydride, the cyclic ether and the aldehyde is relatively slow, a polymerization starting material is advisably included in the anhydride, cyclic ether, and aldehyde comonomer mixture. Compounds capable of starting the polymerization are substances which contain one or more groups capable of forming ester, ether, or acetal groups. Suitable polymerization starters which can be used comprise the group consisting of water, ammonia, inorganic acids capable of effecting the ring-opening reaction of cyclic ethers and anhydrides, and organic compounds having at least one radical selected from the group consisting of hydroxyl, carboxyl, and sulfhydryl radicals. Organic compounds having at least one amino radical substituent can also be employed.

Among the inorganic acids those containing hydrogen, and particularly the monomeric phosphorous-containing acids are preferred. It is to be understood, however, that inorganic acids which destructively decompose organic compounds, such as nitric acid, are advisably not employed. Suitable inorganic acids are hydrogen fluoride, hydrogen chloride, hydrogen bromide, hydrogen sulfide, hydrogen cyanide, phosphorous acid, phosphoric acid, and boric acid. A phosphorous-containing or boron-containing polymerization starter is particularly useful when the final product should have flame-retarding properties.

Organic polymerization starters are compounds containing one or more substituents selected from the group consisting of OH, COOH, SH and $NH_2$ radicals. Starters having from two to six such radicals are especially preferred. Suitable organic polymerization starters comprise alcohols, carboxylic acids, hydroxy-carboxylic acids, phenols, mercaptans, thiocarboxylic acids, amines and amino alcohols. Among the organic polymerization starters, those having alcoholic hydroxyl groups, such as the aliphatic alcohols, ether alcohols, and saccharides are preferred. Especially preferred are aliphatic diols and triols, since they result in compositions with good color and viscosity characteristics. Polymerization starters having amino radicals, such as $NH_2$ or NH, can be used, but are least preferred since they frequently lead to undesirable color formation and also tend to lower the degree of polymerization in the polyether linkage, e.g. to decrease the length of the polyether segments.

Mixtures of polymerization starters, in particular aqueous or alcoholic mixtures may be used to advantage. Examples of very useful mixtures are water-polyol, and water-saccharide mixtures having from one to 80 percent by weight of water, and polyol-saccharide mixtures having from 5 to 90 percent by weight of polyol.

Particularly useful polymerization starters are those having alcoholic hydroxyl groups. One group of very useful alcoholic polymerization starters comprises aliphatic alcohols having from one to 18 carbon atoms and from one to eight hydroxyl groups. Particularly desirable are the aliphatic diols having from two to 18 carbon atoms, and the ether glycols of 4 to 15 carbon atoms. Polyols having from three to six carbon atoms and from three to six hydroxyl groups are also useful since they lead to higher-molecular weight, high-functionality products faster. Polymeric alcohols, such as polyvinyl alcohol and partially hydrolyzed polyvinyl acetate, for example, may also function as polymerization starters. Polyether alcohols having from one to more than eight hydroxyl groups and a molecular weight ranging from about one hundred to about 5000 are also useful starters.

Representative alcoholic polymerization starters that can be used are mono- and poly-hydroxy-containing alcohols such as methanol, ethanol, propanol, butanol, pentanol, hexanol, stearyl alcohol, benzyl alcohol, ethylene glycol, propylene glycol, butylene glycol, diethylene glycol, triethylene glycol, tetraethyene glycol, dipropylene glycol, tripropylene glycol, dibutylene glycol, tributylene glycol, 1,12-octadecanediol, glycerol, trimethylol ethane, trimethylol propane, triricinolein (castor oil), pentaerythritol, dipentaerythritol, tripentaerythrirtol, sorbitol, xylitol, mannitol, and inositol. Commercially available mixtures of glycerol, sorbitol and intermediate alcohols are especially useful. Triethanolamine and tripopanolamine are also of use. Oxyethylene and oxypropylene adducts of glycerol and trimethylol propane having molecular weights of about 250 to 3000 and oxyalkylene adducts of sorbitol having molecular weights of up to about 2000 have also been found to be useful.

Saccharides comprise another group of useful polymerization starters containing alcoholic hydroxyl groups. Saccharides ranging from the monosaccharides, such as xylose and dextrose, through disaccharides, such as sucrose and lactose, to trisaccharides, such as raffinose and to higher polysaccharides such as alpha-cyclodextrin, beta-cyclodextrin, and gamma-cyclodextrin may be used. Especially useful are the mono- and di-saccharides having from five to twelve carbon atoms and from four to eight hydroxyl groups. Derivatives such as alpha-methyl glucoside, ethylene glycol diglucoside, and the like may also be employed as polymerization starters. Saccharides other than those named may be used. Polymerization starters of less well-defined composition, such as molasses, corn syrup, cornstarch, potato starch and various linear and branched dextrins may be employed. With the more difficultly soluble materials the more readily soluble portions are generally utilized. Some polysaccharides may hydrolyze to lower molecular-weight materials under the acidic conditions of the reaction when water is present.

As mentioned above, water has also been found to be a useful polymerization starter and it has been found that the hydrates of polyols and saccharides may also be used as well. Examples of useful hydrates are those of dextrose, lactose, raffinose, sorbitol and others.

Examples of phenolic hydroxy-containing compounds which may be employed are phenols having from 6 to 15 carbons and from one to three phenolic hydroxyl groups, such as phenol, cresol, xylenol, resorcinol, catechol, phloroglucinol and 2,2-bis(4-hydroxyphenyl)-propane.

Organic carboxylic acids and hydroxy-carboxylic acids constitute another group of useful polymerization starters. Carboxylic acids which have been used are those having from 2 to 54 carbon atoms and from one to four carboxylic acid radicals. Very useful starters are saturated aliphatic acids having from one to 18 carbon atoms, such as for example acetic acid, propionic acid, butyric acid, succinic acid, glutaric acid, adipic acid, tricarballylic acid and stearic acid. Unsaturated aliphatic acids having from three to 54 carbon atoms and from one to three double bonds may also advantageously be employed. Representative of such acids are acrylic acid, methacrylic acid, oleic acid, aconitic acid, maleic aid, fumaric acid, linoleic acid, linolenic acid, dilinoleic acid and trilinoleic acid. Aromatic acids, such as benzoic acid, phthalic acid, isophthalic acid, terephthalic acid, pyromellitic acid and trimellitic acid may also be used.

Examples of hydroxy-carboxylic acids which have been employed are those having from 2 to 18 carbons, from one to 5 hydroxyl groups and from one to three carboxyl groups, such as hydroxyacetic acid, citric acid, malic acid, tartaric acid, 12-hydroxyl stearic acid, ricinoleic acid and gluconic acid. Acidic natural products, such as gum copal, gum dammar and abietic acid may also be used. Other available carboxylic acids and hydroxy-carboxylic acids can be used.

Sulfhydryl-group-containing compounds useful as polymerization starters comprise aliphatic mono- and poly-thiols, especially algyl mercaptans containing from one to 12 carbon atoms, the ester derivatives of aliphatic mercaptoalkyl carboxylic acids, such as alpha-mercaptoacetic acid and beta-mercaptopropionic acid having from 3 to 24 carbon atoms and from one to six sulfhydryl groups, and thiophenols. Examples of sulfhydryl compounds that may be employed include such compounds as methyl mercaptan, ethyl mercaptan, butyl mercaptan, octyl mercaptan, monothio-, dithio-, and trithio- glycerol, pentaerythritoltetrakis - beta - mercaptopropionate, pentaerythritol-alpha-mercaptoacetate, glyceroltris - beta - mercaptopropionate, glyceroltria-alpha-mercaptoacetate, sorbitol-beta-mercaptopropionate, sorbitol-alpha - mercaptoacetate (various esters), and thiophenol and thiocresol. Thiokol-type polymers having free sulfhydryl groups and molecular weights of generally not more than 10,000 may be employed.

Examples of amines which can be employed as polymerization starters are primary and secondary amines having from 1 to 18 carbon atoms and 1 to 5 amino or imino groups. Examples are mono and di-methylamine, mono- and di-ethyl amine, butyl amine, morpholine, piperazine, ethylene diamine, diethylene triamine, triethylene tetramine, tetraethylene pentamine, laurylamine, stearylamine, ethanolamine, diethanolamine, and isopropanolamine.

The copolymerization between the cyclic anhydride, the cyclic ether, the aldehyde or its cyclic polymer, and desirably a polymerization starter, is effected by bringing the reactants together, in intimate admixture at elevated temperature, and advisably at superatmospheric pressure. The polymerization process can be effected batch-wise in a closed vessel, such as an autoclave equipped with agitation, or under continuous reaction conditions in a tubular reactor at elevated temperature. In the preferred mode of operation all reactants are combined initially before heating the reaction mixture. It is to be understood, however, that the entire amount of cyclic ether or all of the anhydride or aldehyde does not have to be present at the start of the reaction but that these reactants may be suitably added in a few sizable portions during the course of the polymerization. Such a mode of operation is especially suitable if it is desired to incorporate particular monomer residues at specific locations in the polymer chains. Regardless of the mode of operation it is, however, advisable that the total amount of the polymerization starter is present at the start of the reaction. It is further very advisable to conduct the polymerization in a manner such that a substantial concentration of the cyclic ether and the aldehyde is present intimately admixed with the other reactants during the time in which a major proportion of the polymerization takes place. A mode of operation in which the aldehyde or the cyclic ether is continuously added in a large number of small increments may be employed, but is not favored since such a mode of operation does not result in the formation of acetal and ether segments having desirably large degrees of polymerization. If polymerization starters are used which undergo unwanted side reactions with aldehydes, the polymerization starter may first be reacted with a small fraction of the total amount of the cyclic ether and the cyclic anhydride to form a hydroxyl- or carboxyl-terminated polymer and the aldehyde is introduced subsequently along with the remainder of the cyclic ether and anhydride.

Depending on the reactants and temperatures employed, the polymerization is completed in from a few minutes to a few hours. A temperature of about 70° C., and preferably of 90° C. or higher is generally used, although a temperature above 225° C. is generally not required and leads to adverse results. The most suitable temperatures for the process are about 100° C. to 220° C. and advisably about 130° to 200° C. However, lower and higher temperatures can be used as warranted by the reactants used. If saccharides are used as polymerization starters, the reaction is suitably conducted within a temperature range of 120° to 160° C. If strong acids, such as phosphorous-containing acids, are used as starters, or if halogenated anhydrides, such as chlorendic anhydride or dichloromaleic anhydride, are employed the temperature necessary to achieve reaction is considerably lowered. For example, polymers from chlorendic anhydride, a polyol, formaldehyde and an epoxide are formed at a satisfactory rate at 80° C.

Although some water can form in the process because of the starting material used, it is not essential to remove the water during the process for the polymerization to proceed. Since it is not essential to remove small molecules such as water or alcohol to have the reaction proceed to completion, the process can be run in a completely closed system thus avoiding any losses of volatile reaction components. Superatmospheric pressure, such as autogeneous pressure, is used for the polymerization although even higher pressures are very suitable in producing these ternary copolymers. The pressure used has to be at least equal to or higher than the vapor pressure of the reaction mixture at the reaction temperature. A minimum pressure of 1.5 atmospheres is advisably used, and in most cases where lower epoxides are used, reaction pressures will vary from at least about 50 pounds per square inch to about 300 pounds per square inch.

The process of this invention does not require the use of a catalyst. However, strong acids (i.e., those which ionize at least as much as bromoacetic acid) have been found to act as catalysts, and if strong acids or anhydrides derived from strong acids are used as reactants the process becomes autocatalytic. Phosphoric acid, phosphorous acid, dichloromaleic anhydride, tetrachlorophthalic anhydride and chlorendic anhydride are some that can be used as catalysts. A substantial increase in the rate of reaction is also observed if impure chloral contaminated with small amounts of trichloroacetic acid is used as a reactant. Since no catalytic residues remain in the final polymer, there is no need for purification. Furthermore, additional post-treatment steps needed in other processes to remove catalyst residues are not required in this invention.

In preparing these random copolymers the mol ratio of cyclic ether to cyclic anhydride may be varied from about 1:1 to generally not more than about 10:1, and more commonly not more than 6:1. The lower mol ratios tend to give predominantly carboxylic acid end groups, and the higher values hydroxyl end groups. The nature of the end groups is determined by the relative concentration of cyclic ether and anhydride in the terminal stages of the reaction. If cyclic ether predominates, hydroxyl end groups will result. If the anhydride concentration is still substantial, then carboxylic acid end groups will be formed. The amount of aldehyde employed will constitute at least one percent, and usually at least five percent and more frequently at least ten percent to not more than 99 percent and usually not more than 95 and more commonly not more than 90 percent by weight of the total reactant mixture.

The composition of a binary polyether-polyester copolymer is dependent on the ratio of cyclic ether to anhydride in the reaction mixture and the average length of the polyether segments is a direct function of this ratio.

When an aldehyde is used as a comonomer together with cyclic ethers and anhydrides the average degree of polymeriaztion of the polyether linkages is necessarily decreased because of the interspersing of acetal linkages among the ether links. The shortening of these polyether structures is directly dependent on the relative amount of aldehyde incorporated. However, it seems that the relative amounts of anhydride and epoxide incorporated into the polymer are actually relatively indepedent of the relative amount of aldehyde present in the reaction mixture, but are only dependent on the ratio of epoxide to anhydride employed.

Suitable amounts of polymerization starter employed in the process will range from about 0.1 percent to more than 25 percent by weight of the total reactant mixture. In general, larger amounts of higher-molecular-weight starting materials are used than those of lower molecular weight. When compounds of low molecular weight, such as water, or hydrogen sulfide, are used, the amount of starter will generally not exceed 10 percent by weight of the total reactant mixture. In some instances involving starters of high equivalent weight, or polymers of low equivalent weight, the proportion of starter may exceed 50 percent by weight of the total reactant mixture. For example, if a low-moleculer-weight polymer is formed by reacting an epoxide, an aldehyde, and an anhydride using stearyl alcohol as the starter, about 50 percent of the total polymer weight could be derived from the starter residue. The important consideration in determining the amount of starter to be used in preparing thermoplastic random ternary copolymers is the ratio of the polymer equivalent weight desired to the starter equivalent weight. The equivalent weight of the starter is computed by dividing the starter molecular weight by the number of functional groups capable of starting the polymerization reaction. The equivalent weight of the polymer is computed by dividing the polymer molecular weight by the number of polymer chain-end groups. Thus the ratio of the weight of starter used to the total weight of the polymer formed is the same as the ratio of starter equivalent weight to the polymer equivalent weight.

The resulting random ternary copolymers may vary from viscous liquids and glassy or crystalline thermoplastic solids to cross-linked infusible resilient or non-resilient solids. The physical form of these ternary copolymers can be varied within wide limits by appropriate choice of the reactants allowing extensive control over regularity, bulkiness, polarity, stiffness and branching. The use of aldehydes as comonomers allows an additional degree of freedom in tailoring the properties, such as rigidity or flexibility, of the polymer chains. If an unsubstituted low-molecular-weight aldehyde or epoxide, such as formaldehyde or ethylene oxide, is used as a reactant the resulting linear, unhindered acetal or ether segments impart more flexibility to the polymer chain. If the aldehyde or epoxide monomer has bulky substituents, however, the resulting polymer chains will be stiffened by the presence of the pendant bulky groups. Likewise, the use of saturated aliphatic anhydrides, such as succinic anhydride, results in flexible polymer chains and the use of anhydrides with ring structures, such as phthalic anhydride, results in considerable stiffening of the polymer chains. Thus the rigidity and flexibility of the polymer chains can be easily controlled by selection of the monomers.

The process of this invention permits the use of monomers of lower initial cost than previous processes. The use of large amounts of aldehydes in the preparation of these ternary copolymers appears particularly attractive. Specifically, formaldehyde and acetaldehyde are substantially less expensive than the other cyclic comonomers, and thus a polymer containing a large proportion of acetal linkages can be very advantageous from an economic point of view. In addition, trichloroacetaldehyde is a considerably less expensive source of chlorine than are the chlorinated acid anhydrides. Thus, the use of these inexpensive aldehyde monomers in combination with epoxides and cyclic anhydrides, plus the simplicity, ease and speed in operation of the process results in considerable savings in the cost of the final polymer.

The total molecular weight of the random ternary copolymers may vary over a wide range and will depend on the quantities and nature of the reactants employed. There appears to be no upper limit on the molecular weights which can be achieved and molecular weights as high or as low as desired may be obtained. Thermoplastic compositions of interest will generally have molecular weights varying from about 500 to not more than about 50,000, and frequently to less than 30,000. The equivalent weight of poly-functional compositions will be determined by the nature of the polymerization starter and the molecular weight.

Because of the nature of the addition polymerization reaction by which they are prepared, the novel thermoplastic copolymer compositions which are prepared only from difunctionally reactive cyclic ethers, anhydrides, and aldehydes, in the absence or presence of a polymerization starter according to this invention are further characterized by having a relatively narrow molecular weight distribution, that is, the differences in molecular weight between individual polymer molecules are relatively small, with the ratio of weight-average to number-average molecular weights being less than 1.5. Under theoretical conditions, ring-opening polymerizations generally lead to polymers with molecular-weight distributions of a type referred to as Poisson-type which are much narrower than the distributions of the geometric type characteristic of polymers produced by polycondensation processes. Such thermoplastic compositions also exhibit desirably low viscosities.

The molecular weights of partially and completely cross-linked compositions will be higher and will increase with the degree of cross linking. The ratio of weight-average to number-average molecular weight will also increase with cross linking.

According to a further aspect of the invention, there are provided novel ternary copolymers having ester, ether and acetal groups but with the acetal groups present in the form of regular blocks, rather than distributed randomly, and with the acetal blocks bounded by or separated from each other by blocks composed of random polyester-ether copolymer. The production of such block terpolymers incorporating preformed polyacetal blocks is based on the discovery that polyacetals having active-hydrogen-containing substitutents and of the formula

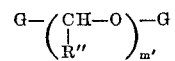

where R" has the previously assigned meaning, $m'$ is an integer varying from 5 to 500 and G is a radical of the group consisting of OH, COOH, NH, $NH_2$, and SH radicals, can act as polymerization starters for the addition copolymerization of epoxides and anhydrides and thereby become incorporated as polyacetal blocks into the polymer chains.

In this specific embodiment of the present invention these polymers are produced by reacting together (1) a cyclic ether selected from the group consisting of epoxides and oxetanes (2) an anhydride selected from the group consisting of linear and cyclic anhydrides of organic polycarboxylic acids and (3) a linear polyacetal terminated with active-hydrogen containing end groups. Especially preferred polymerization starters are the polyacetals having terminal hydroxyl groups. In addition to the polyacetal, other active hydrogen-containing polymerization starters previously described herein may be employed in admixture. The mode of operation, temperature, pressure and nature of the cyclic ether and cyclic anhydride are essentially the same as in the process described herein using monomeric aldehydes. Cyclic anhydrides and cyclic ethers as named herein previously can be used in this embodiment. Linear anhydrides previously listed may also be employed.

Examples of some of the polyacetals that can be used are polyoxymethylene, polyacetaldehyde, polychloral, and polybromal. Suitable polyacetals will have molecuar weights of at east 200, and usually at least 400 and preferably at least 1000. The polyacetals are prepared by methods known to the art. Particularly preferred for use in the present invention are hydroxyl-terminated polyoxymethylenes having a very low methoxyl content and having molecular weights ranging from about 1000 to about 10,000 and higher. Suitable high-molecular weight polyoxymethylenes may be prepared by methods known to the art, such as the polymerization of pure formaldehyde, free of water and methanol, in inert solvents in the presence of amine catalysts, or the polymerization of trioxane with Lewis acid catalysts. A preferred inexpensive source of suitable polyoxymethylenes is provided by commercially available methanol-free paraformaldehyde, which is prepared from formaldehyde made by the oxidation of hydrocarbons rather than the oxidation of methanol, and which has a formaldehyde content of at least about 90, and preferably, about 95 percent by weight, with the remainder consisting of water. The molecular weight of such commercially available methanol-free paraform may be increased by heating, preferably below the melting point, either concurrent with, or followed by the application of a vacuum, to remove water. The progress of this increase in molecular weight is conveniently followed by noting the accompanying increase in melting point. References describing the increase in molecular weight by heating include Brown and Hrubesky, Ind. Eng. Chem., 19, 217 (1927), Auerbach and Barschall "Studien uber Formaldehyde—Die Festen Polymeren des Formaldehyds" pp. 7–9, Berlin, Julius Springer (1907) and Walker, J. Am. Chem. Soc. 55, 2823–4 (1933).

These hydroxyl-terminated polyoxymethylenes prepared by the dehydration of methanol-free paraformaldehyde, and having molecular weights in the range of 2000–10,000, and even higher, are particularly cheap and desirable raw materials for the preparation of the block terpolymers of the present invention. In preparing these block terpolymers, the mol ratio of cyclic ether to anhydride generally employed will vary from about 2:1 to about 6:1, and the polyacetal starter will constitute from about 5 to 98 percent by weight of the total reaction mixture, and frequently from about 20 to 90 percent by weight.

If only difunctionally reactive cyclic monoethers and cyclic monoanhydrides are employed, one polyacetal block will become incorporated into each polymer chain. The polyacetal with active-hydrogen end groups serves as a linear, high-molecular-weight nucleus to which is attached chains of polyester-ether by reacting with the cyclic anhydride and the cyclic ether. The final product has a block polymer structure, with a block of polyacetal separating blocks of polyester-ether. The polymer chains of the resulting thermoplastic block polymer can be represented by the schematic sequence E-A-B-A-E, wherein E are active-hydrogen-containing end groups selected from the group consisting of hydroxyl and carboxyl radicals. A represents a random polyester-ether copolymer block composed of one or more recurring units of the structural formula

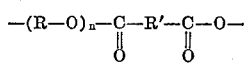

and B is a polyacetal block of the structural formula

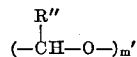

wherein R, R", and n have the previously assigned meaning, R' is a hydrocarbon radical having from 2 to 12 carbon atoms and from zero to six halogen substituents of the group consisting of chloro and bromo radicals and is identical with the radical connecting two carboxylic acid carbonyl functions in a dicarboxylic acid

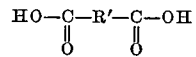

and $m'$ is a positive whole number ranging from about 5 to generally not more than 500, and frequently to not more than 100.

Preferred compositions are those in which R is 1,2-ethylene or 1,2-propylene and R' is selected from 1,2-ethylene, 1,2-ethenylene (—CH=CH—), 1,2-phenylene, 3,4,5,6-tetrachloro-1,2-phenylene, 3,4,5,6-tetrabromo-1,2-phenylene, 3,4,5,6-tetrahydro-1,2-phenylene and hexachlorobicycloheptenylene.

Desirable compositions will generally contain from at least about 2 percent and usually not less than five percent by weight of A blocks up to not more than about 95 percent by weight and frequently not more than 90 percent of A blocks. The weight fraction of B blocks will vary from about 5 percent, and usually from about 10 percent by weight, to not more than 98 percent and generally not more than 95 percent by weight. Of the weight fraction of the polymer which is the polyester-ether copolymer, the residues of cyclic ether and anhydride are present in such a proportion that the molar ratio of R to R' will range from about 1.25, and usually from 1.5, and preferably from about 2 up to not more than ten and preferably to not more than six.

For example if the original polyacetal and the final copolymer have hydroxyl end-groups, then the final polymer molecules based upon the polyacetal chains can be represented essentially as follows:

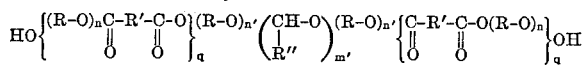

wherein R, R' and R" have the previously assigned meanings, and $n$ is an integer varying from one to about five, and having an average value ranging from 1.01 to ten and generally from 1.25 to 6, $n'$ is an integer varying from zero to about five, $m'$ is an integer varying from about five to five hundred, and usually is less than one hundred, and $q$ is a number having an average value varying from about one to generally not more than fifty.

Several simplifications have been made in the above representation. Since the polyacetal containing hydroxyl end-groups is somewhat unstable at the reaction temperature, an amount of free aldehyde may be lost from the polyacetal by thermal depolymerization and become incorporated into the polyester-ether portion of the molecule. Consequently the polyacetal portion of the molecule will probably contain less aldehyde units than did the original polyacetal structure, and the polyester-ether segments may contain a few acetal members, and it is to be understood that such minor structural deviations are included within the scope of the general description hereinabove and in the claims.

Block terpolymer compositions having molecular weights as high as desired can be prepared, however, the thermoplastic products of interest will generally have a molecular weight of at least 500 and frequently not more than 50,000, and preferably not more than 30,000. The average degree of polymerization in the ether segments will be at least 1.01 and may be as high as ten, and will generally vary from about 1.25 to about six.

The above representations are of the polymer based on a nucleus composed of a polyacetal only. Additional active-hydrogen functional compounds may be included as nucleus-forming agents.

A relatively high proportion of polyacetal structures may readily be incorporated into polymers prepared by this method. By choosing the proper reactants it is possible in this manner to prepare a polymer which is primarily polyacetal in structure and has only relatively small blocks of polyester-ether end structures. Depending on the original molecular weight of the polyacetal chains it is possible to prepare block polymers containing more than 90% by weight in the central polyacetal block. For example, if the original polyacetal used as starter has a molecular weight of 10,000, and short polyester-ether chains having molecular weights of 500 are attached to the ends, then the polyacetal content of the final polymer is 90.9%.

Polyester-ether-acetals containing a relatively large content of polyacetal structure have properties largely dictated by the central polyacetal block. Thus such polymers based on polyoxymethylenes are characteristically crystalline, hard and dense, and have the appearance and "feel" associated with other known modifications of polyoxymethylene.

The polyester-ether-acetals are chemically and thermally stable. They are less sensitive to attack by chemical reagents than are the unmodified polyacetals. The process of reacting a polyacetal with a cyclic anhydride and an alkylene oxide is thus a desirable method of obtaining thermally stable polymers from polyacetals.

The method of preparation of these block copolymers is unique in that it allows coupling together of blocks of polyacetal structure by the use of a dianhydride or bisepoxide in the polymerization. If only a relatively small proportion of such a multifunctional reactant is employed, then the resulting polymer is a longer, straight-chain, or slightly branched structure incorporating a multiplicity of polyacetal blocks. Such a polymer is tougher, and has a higher melt viscosity than the corresponding polymer containing only one polyacetal block. If a relatively large proportion of such multifunctional reactants are employed, then the resulting polymer is highly branched or even cross-linked. Such cross-linked structures are infusible and quite thermally and chemically resistant. These cross-linked structures would appear to be the only known representatives of the class of thermosetting polymers containing large blocks of polyacetal structures. They thus provide a one-step method of making molded articles and shapes. The useful cross-linked compositions will generally have the same content of polyacetal, cyclic ether, and cyclic anhydride residues as those of the thermoplastic compositions, except that a portion of cyclic ether or cyclic anhydride residues consist of residues of polyfunctional i.e., functionality of greater than 2, reactants.

The thermoplastic random ternary copolymers described herein possess utility as surface-active agents and as polymeric plasticizers, and they are particularly useful as resin intermediates. Especially useful in this regard are the terpolymers containing bromal and chloral residues since they lead to flame-retardant compositions.

The ternary block copolymers, and the chain-coupled ternary block copolymers having a high proportion of internal polyoxymethylene linkages are useful as highmelting, rigid thermoplastics, especially as molding and extrusion resins, and as textile fibers.

Both the random and the block ternary copolymers which possess a multiplicity of reactive olefinic double bonds, such as residues of maleic or itaconic anhydride may be reacted with unsaturated vinyl monomers, such as styrene, alpha-methyl styrene, vinyl toluene, methyl methacrylate, divinyl benzene and chlorostyrene in the presence of a free-radical initiator or its equivalent to form flexible-to-semi-rigid casting, laminates and potting compositions. In preparing such compositions techniques known to the art are employed.

Another excellent application of the thermoplastic random or block terpolymers of the present invention is in combination with organic polyisocyanates as components in polyurethane formulations, such as coatings, foams, castings, and elastomers. Depending on the terpolymer selected, polyurethanes varying from rubbery, flexible products to hard, cross-linked compositions may be prepared. The hydroxyl-terminated polyoxymethylene block terpolymers having easily crystallizable polyesterether blocks, such as for example polyoxyethylene succinate, may be reacted with organic diisocyanates to form elastomeric fibers. In the preparation of polyurethane compositions from the copolymers described herein techniques generally employed in the art are used.

The insoluble, cross-linked terpolymers of the present invention are useful as casting, laminating and potting resins.

The following examples are presented to illustrate the invention.

Example 1

This example illustrates the preparation of a ternary polyester-ether-acetal copolymer containing acetal linkages derived from formaldehyde.

Phthalic anhydride (41.2 grams), glycerol (5.6 grams) and propylene oxide (44.4 grams) are placed into a stainless steel bomb. Then gaseous formaldehyde (9.0 grams), prepared by pyrolysis of paraformaldehyde, is weighed in, and the bomb is sealed. The bomb is then heated at 132° C. for one hour, 151° C. for another hour and 176° C. for three hours. The product is very viscous, and has an acid number of 3. There is only a small amount of volatiles present.

Example 2

This example illustrates the preparation of a ternary polyester-ether-acetal copolymer containing acetal linkages derived from acetaldehyde.

Phthalic anhydride (44.6 grams), glycerol (5.0 grams), propylene oxide (46.0 grams) and acetaldehyde (7.5 grams) are sealed together in a thick-walled glass tube. The tube is heated at 135° C. for one hour and twenty minutes, at 158° C. for 30 minutes, at 178° C. for 45 minutes and at 189° C. for 40 minutes. The product is viscous, yellow-orange in color, and has an acid number of 13.

Example 3

This example illustrates the preparation of a ternary polyester-ether-acetal copolymer in which the acetal linkages are derived from chloral.

Phthalic anhydride (10.1 grams), glycerol (3.1 grams), propylene oxide (10.3 grams) and freshly distilled chloral (25.1 grams) are sealed together in a heavy-walled glass tube. The mixture warms slowly because of an exothermic reaction. The tube is then heated consecutively at 149° C. for three and a half hours and at 159° C. for three hours. The product is an extremely viscous, light-orange product with an acid number of 20. The product is of particular interest because of its high chlorine content of 37%.

Example 4

This example illustrates the preparation of a polyesterether-acetal ternary copolymer containing acetal linkages derived from benzaldehyde.

Phthalic anhydride (13.5 grams), trimethylolpropane (1.5 grams), propylene oxide (15.1 grams), and benzaldehyde (8.8 grams), are sealed together in a heavy-walled glass tube. The tube is heated at 143° C. for twelve hours. The resulting product is a viscous polymer.

Example 5

This example illustrates the preparation of a crosslinked, infusible polymer containing acetal linkages derived from terephthalaldehyde.

Phthalic anhydride (17.9), tetrachlorophthalic anhydride (1.7 grams), glycerol (2.4 grams), propylene oxide (20.0 grams), and terephthalaldehyde (8.1 grams) are sealed together in a strong heavy-walled glass tube. The mixture is heated at 154° C. for 22 hours. The product is a clear gel at oven temperature, and becomes rigid on cooling. The polymer chains have been cross-linked through the terephthalaldehyde acetal linkages.

Example 6

This example illustrates the preparation of a copolymer containing acetal linkages derived from acetaldehyde.

The cyclic acetaldehyde trimer is used in the preparation of the polymer.

Tetrachlorophthalic anhydride (26.9 grams), glycerol (3.0 grams), propylene oxide (18.6 grams), and cyclic acetaldehyde trimer (5.2 grams) are sealed together in a heavy-walled glass bomb tube. The contents are cooled in an ice bath while the tube is being sealed. After sealing, the tube is rapidly heated, with frequent shaking, to 167° C. and is kept at this temperature for five hours. The product is very viscous.

Example 7

This example illustrates the use of formaldehyde in the preparation of unsaturated polymers with improved color.

Phthalic anhydride (15.1 grams), maleic anhydride (11.8 grams), glycerol (2.5 grams) and propylene oxide (30.6 grams) are placed in a stainless steel bomb tube. Then gaseous formaldehyde (5.8 grams) is weighed in and the bomb is sealed. The bomb is heated at 157° C. for one hour and 20 minutes. The product is a viscous fluid with a pale, pinkish-yellow color. The color is considerably lighter than that of a polymer prepared without formaldehyde.

Example 8

This example illustrates the preparation of a polyurethane foam from the ternary copolymer prepared in Example 1.

The polymer (19.8 grams) is mixed together with 0.5 grams of fluorotrichloromethane, five drops of silicone-glycol copolymer, three drops of tetramethyl-1,3-butanediamine, four drops of stannous octoate, and 0.4 gram of water. Then 2,4-tolylene diisocyanate (8.2 grams) is added and rapidly stirred in. The resulting foam is cured at 85° C. for two hours. The product is a stiff, tough foam which shows no appreciable shrinkage on cooling.

Example 9

This example illustrates the preparation of a polyester-ether-acetal based on commercial paraform.

Flake paraform (2.55 grams), phthalic anhydride (0.3 gram), and propylene oxide (0.4 gram) are sealed together in a glass tube and heated at 190° C. for three hours. The mixture is a colorless, glass-clear fluid melt. On cooling, the mixture solidifies to a colorless, soft wax having an ivory-like luster.

Example 10

This example illustrates the preparation of a polyester-ether-acetal based on a polyoxymethylene having a high molecular weight.

Pure, dry formaldehyde gas is prepared by pyrolyzing paraformaldehyde, and passing the gaseous products through a silica gel column maintained at −15° C. The gas is then introduced into a solution of 0.2% dimethyl octadecyl amine in cyclohexane. The polymer which precipitates is washed with ether and dried under vacuum. The resulting polymer has hydroxyl end groups and a molecular weight in excess of 10,000.

The above polymer (3.6 grams), phthalic anhydride (0.2 gram), and propylene oxide (0.3 gram) are sealed in a heavy-walled glass tube and heated at 197° C. for three hours. The product is a clear viscous melt at oven temperature and is a colorless, hard, tough solid at room temperature.

Example 11

This example illustrates the preparation of a cross-linked polyester-ether-acetal from commercial paraform.

Phthalic anhydride (0.35 gram), flake paraform (2.35 grams) and epoxycyclohexylmethyl-epoxycyclohexyl carboxylate (0.7 gram) are sealed together in a heavy-walled glass tube. The tube is heated to 375° F. for four hours. The product is a clear gel at oven temperature and crystallizes to a hard, moderately tough resin at room temperature.

Example 12

This example illustrates the preparation of a polyester-ether-acetal based on polychloral.

Chloral was distilled from powdered calcium oxide. The clear, colorless distillate was allowed to stand for several months. During this time a small amount of white polymer formed on the walls of the vessel. This adventitious polymer was filtered and allowed to dry.

The dried polymer (1.5 grams), phthalic anhydride (0.2 gram), and propylene oxide (0.35 gram) were sealed in a glass tube and heated at 160° C. for 55 minutes.

The product was a clear, nearly colorless liquid which is quite viscous at room temperature.

Example 13

Flake paraformaldehyde, having a formaldehyde content of 91–92% and a very low content of methanol is dried overnight at room temperature under a vacuum of about 0.1 mm. pressure of mercury.

2.73 grams of the vacuum-dried material, 2.30 grams of maleic anhydride, and 3.44 grams of propylene oxide are sealed together in a heavy-walled glass tube, and heated at 165° C. for 4 hr. and 37 min. The resulting polymeric product is of moderate viscosity and has a very pale yellow color. It partially crystallizes on standing at room temperature. The infrared spectrum exhibits a strong ester carbonyl absorption band.

3.90 grams of this polymer is heated with 0.69 grams of tolylene diisocyanate at 70° C. for 1½ hr. The product is a clear, gummy rubber.

Example 14

The vacuum-dried paraformaldehyde of Example 13 is heated overnight in a sealed tube at 140° C., to increase its molecular weight. Then it is heated at 154° C. for 5 hours in a sealed tube until it just begins to sinter. This material is then again vacuum dried overnight.

1.27 g. of this treated material, 1.29 g. of maleic anhydride, and 1.56 g. of propylene oxide are heated at 166° C. for 2 hr. and 33 minutes. The color is pale yellow, and the product crystallizes rather quickly on cooling.

In a second experiment, 1.26 g. of the treated material, 0.32 g. of maleic anhydride, and 0.52 g. of butylene oxide are heated at 185° C. for 1 hr. and 40 min. There is some condensate of unreacted epoxide as the tube is cooled, and there is also some condensate of unreacted paraformaldehyde in the top of the tube. The cold product is a medium-soft, slightly tacky wax.

Example 15

Powered paraformaldehyde of 95% formaldehyde content, and of very low methanol content is heated for 18½ hr. at 140° C. The product is partially sintered.

1.40 grams of this material, 1.20 grams of maleic anhydride, and 1.44 grams of propylene oxide are heated in a heavy-walled, sealed glass tube at 165° C. for about 1 hour before the contents fully melt. After 5¼ hr., the product is cooled. The product is pale yellow and extremely viscous. It becomes cloudy and partially crystallizes on standing at room temperature.

2.47 grams of this terpolymer, 1.09 grams of styrene, and 0.02 gram of azobis(isobutyronitrile) are heated at 70° C. for 2 hr. The cured product is opalescent, and has a Shore A hardness of 85. It is flexible and not brittle.

Example 16

This example illustrates the use of an aldehyde co-monomer to substantially reduce the viscosity of a high-functionality polyol. The example, part B, is nearly identical wtih part A except that prionaldehyde is added to the rectant mixture, and the amount of the other reactants is decreased by 10%.

(A) In a 1-liter, stirred 316 stainless steel pressure vessel was placed 135.7 grams of anhydrous dextrose, 39.8 grams of 99.5% glycerol, 240.4 grams of phthalic anhydride, and 494.0 grams of propylene oxide. The vessel was closed, and then heated at 295–340° F. for 3 hr. The excess propyline oxide was then vented. The recovered product weighed 758 grams, and had a viscosity of 408,000 centipoises at 25½° C.

(B) In a 1-liter, stirred 316 stainless steel pressure vessel was placed 121.4 grams of anhydrous dextrose, 36.7 grams of 99.5% glycerol, 212.5 grams of phthalic anhydride, 447.1 grams of propylene oxide, and 71.6 grams of propionaldehyde.

The vessel was closed and heated at about 290–330° F. for 4 hr. 40 min. Then the excess epoxide and aldehyde were vented, and the product recovered. The product was an olive color and weighed 724 grams, about 42 grams of which consisted of chemically combined propionaldehyde residues. The polymer had a viscosity of 80,000 centipoises at 25½° C.

Example 17

In a heavy-walled glass tube are combined 0.15 gram of trimethylolpropane, 1.2 grams of maleic anhydride, 1.4 grams of 1,2-butylene oxide and 1.2 grams of 2-ethyl hexaldehyde. The tube is sealed, and then heated at 150° C., with intermittent shaking, for 5 hr. 23 minutes. The product is a pale yellow homogeneous fluid which has a viscosity of about 100 centipoises at room temperature. The tube is then opened and heated for about 7 hours at 160° C. to drive off the uncombined reactants. The weight loss is 0.51 gram.

Example 18

The same technique is used in Example 17. The raw materials is 0.15 gram of trimethylolpropane, 1.15 grams of maleic anhydride, 1.65 grams of 1,2-butylene oxide, and 0.95 gram of crotonaldehyde. The tube is heated for 4 hr. 7 min. at 150° C. The appearance of the product is similar to that of Example 17, but the polymer viscosity is about 1000 centipoises at room temperature. The seal is then broken and the reaction mixture heated at 160° C. for about 7 hours until a constant weight is obtained. The weight loss is 0.60 gram.

Example 19

The same technique is used as in Example 17. The raw materials are 0.2 gram of trimethylolpropane, 1.25 grams of maleic anhydride, 0.8 gram of propylene oxide, 0.05 grams of triethyl amine and 1.65 grams of 2-ethyl hexaldehyde. The tube is heated at 150° C. for 4 hr. 9 min. The product has a red-brown color, and on cooling separates into two phases. The upper phase, which consists largely of unreacted 2-ethyl hexaldehyde, is very fluid and is about 1 ml. in volume. Thus, about ½ of the aydehyde has become chemically combined. The lower layer, which is the polymeric product, has a viscosity of several hundred centipoises.

Example 20

The same technique is used as in Example 17. The raw materials are 0.40 gram of polyethylene glycol of 200 mol. wt., 1.25 grams of maleic anhydride, 0.75 gram of propylene oxide, 0.05 gram of N-methylmorpholine and 1.30 grams of 2-ethyl hexaldehyde. The tube is heated for 32 minutes at 150° C. The product is black, and on cooling separates into two phases, the upper one of about 1 ml. volume. The viscosity of the lower layer is about 1000 centipoises.

Example 21

The same technique is used as in Example 17. The raw materials are 0.2 gram of citric acid monohydrate, 0.95 gram of maleic anhydride, 1.15 grams of propylene oxide, and 1.1 grams of 2-ethyl hexaldehyde. The tube is heated at 150° C. for 4 hr. 50 min. The product is a pale orange homogeneous fluid with a viscosity of several hundred centipoises at room temperature. The weight loss determined as in Example 17 is 0.45 gram after 7 hours at 160° C.

Example 22

The same technique is used as in Example 17. The raw materials are 0.45 gram of polyoxyethylene glycol of mol. wt. 200, 1.05 grams of succinic anhydride, 1.0 gram of propylene oxide, and 1.7 grams of 2-ethyl hexaldehyde. The tube is heated at 150° C. for 4 hr. 2 min. The product is nearly colorless, and at room temperature separates into two very fluid phases, the upper phase amounting to about 0.75 ml., and consisting largely of unreacted aldehyde. The lower phase is very fluid and consists of the polymeric product.

Example 23

The same technique is used as in Example 17. The raw materials are 0.45 gram of linseed oil fatty acid, 1.25 grams of tetrahydrophthalic anhydride, 1.4 grams of propylene oxide, and 0.9 gram of 2-ethyl hexaldehyde. The tube is heated at 150° C. for 3 hr. 38 min. The product is a colorless, fluid polymer of low viscosity.

Example 24

The same technique was used as in Example 17. The raw materials are 0.35 gram of 85% phosphoric acid, 1.7 grams of tetrachlorophthalic anhydride, 2.4 grams of epichlorohydrin, and 0.9 gram of 2-ethyl hexaldehyde. The tube is heated at 150° C. for 3 hr. 13 min. The product is a homogeneous, pale pink fluid with a viscosity of several thousand centipoises.

Example 25

The same technique was used as in Example 17. The raw materials are 0.45 gram of trimethylolethane tris (thioglycolate), 1.4 grams of phthalic anhydride, 0.9 gram of propylene oxide, and 1.2 grams of 2-ethyl hexaldehyde. The tube is heated at 150° C. for 3 hr. 54 min. The product is pale yellow, and has a viscosity of about 500 centipoises.

Example 26

The same technique is used as in Example 17. The raw materials are 0.45 gram of 85% phosphoric acid, 2.1 grams of chlorendic anhydride, 1.9 grams of trimethylene oxide, and 1.1 grams of 2-ethyl hexaldehyde. There is a vigorous reaction as the phosphoric acid and trimethylene oxide are combined. The sealed tube is heated at 150° C. for 3 hr. 50 min. The product is pale orange brown, and has a viscosity of several hundred centipoises at room temperature.

Example 27

The same technique is used as in Example 17. The raw materials are 0.25 gram of trimethylolpropane, 1.3 grams of phthalic anhydride, 2.9 grams of vinyl cyclohexene monoxide, and 0.8 gram of 2-ethyl hexaldehyde. The tube is heated at 150° C. for 3 hr. 36 min. The product is very pale yellow, and has a viscosity of greater than 10,000 centipoises at room temperature.

Example 28

The same technique is used as in Example 17. The raw materials are 0.2 gram of anhydrous sorbitol, 1.45 grams of phthalic anhydride, 1.35 grams of propylene oxide, and 1.95 grams of 2-ethyl hexaldehyde. The tube is heated at 150° C. for 4 hr. 27 min. The cooled product is colorless and has a viscosity of about 100 centipoises at room temperature. On heating the opened tube at 160° C. for 7 hours, the weight loss is 1.6 grams, indicating that about 0.4 gram of aldehyde has become combined.

Example 29

The same technique is used as in Example 17. The raw materials used were 0.35 gram of trimethylolpropane, 1.45 grams of phthalic anhydride, 2.05 grams of propylene oxide, and 1.15 grams of methacrolein. The tube was heated at 127° C. for 3 hr. 54 min. The product was very pale yellow and had a viscosity of about 100 centipoises. The tube was then opened and heated at an elevated temperature until a constant weight had been obtained. The weight loss due to evaporation of volatile components was 1.195 grams An infra-red spectrum of this devolatilized polymer showed significant absorption bands at 5.45, 5.68, 10.35, 11.1, and 12.7 microns which were not present in the spectrum of the polymers of Examples 16A and 16B.

Example 30

The same technique is used as in Example 17. The raw materials used were 1.6 grams of phthalic anhydride, 1.75 grams of propylene oxide, and 1.15 grams of propionaldehyde. The tube was heated at 127° C. for 5 hr. 27 min. The product was a clear, colorless, somewhat viscous fluid. On opening the tube, the contents partially crystallized. The opened tube was then heated at an elevated temperature until a constant weight was obtained. The weight loss, presumably due to evaporation of unreacted aldehyde and epoxide, was 2.00 grams, thus indicating that at least about 0.9 gram of aldehyde and epoxide became chemically combined.

Example 31

Example 11 is repeated using an equal amount of polyadipic polyanhydride in place of the phthalic anhydride. The reaction is somewhat slower, and the product is somewhat more colored, but the results are otherwise similar to those of Example 11.

Example 32

The polyester-ether-acetal preparation of Example 13 is repeated using polyazelaic polyanhydride in place of the maleic anhydride. The materials used are 2.82 grams of the vacuum-dried material, 3.50 grams of propylene oxide, and 3.99 grams of polyazelaic polyanhydride. The reaction proceeds similarly to that of Example 13 and the product is also similar.

We claim:

1. The process of producing ternary copolymeric compositions containing a multiplicity of ester, ether and acetal units in substantially random distribution in the polymer chains, which consists essentially of reacting together in a closed system at a temperature of about 70° C. to 225° C. (1) a cyclic ether selected from the group consisting of epoxides and oxetanes, (2) a cyclic anhydride of an organic polycarboxylic acid having from four to fourteen carbon atoms and from zero to six halogen substituents selected from the group consisting of chloro and bromo radicals, (3) an aldehyde, and (4) from 0 to 50 percent by weight of the total reactant mixture of a polymerization starter selected from the group consisting of water, ammonia, hydrogen-containing inorganic acids capable of effecting the ring-opening reaction of (1) and (2), and organic compounds having at least one radical selected from the group consisting of hydroxyl, carboxyl, sulfhydryl, and amino radicals, and mixtures thereof, the ratio of mols of reactive cyclic ether groups in said cyclic ether to mols of anhydride groups in said polycarboxylic acid anhydride ranging from one-to-one to about ten-to-one, and the amount of aldehyde varying from about one percent to about 99 percent by weight of the total reactant mixture.

2. The process of claim 1 in which the said cyclic ether is a monoether having from two to ten carbon atoms and from zero to three halogen substituents selected from the group consisting of chloro and bromo radicals, the said aldehyde is a monomeric aldehyde of from one to 12 carbon atoms and from zero to three halogen substituents selected from the group consisting of chloro and bromo radicals, and the said polymerization starter is present in an amount of from 0.2 percent to 50 percent by weight of the total reactant mixture.

3. The process of claim 2 in which the said polymeric compositions have a molecular-weight distribution such that the ratio of the weight-average molecular weight to the number-average molecular weight does not exceed 1.5.

4. The process of claim 2 in which the copolymeric composition has a molecular weight of at least 500 and the said cyclic ether is a saturated aliphatic monoepoxide having from two to six carbon atoms and said aldehyde is an aromatic aldehyde, and said anhydride is a cyclic monoanhydride.

5. The process of claim 4 in which the aromatic ring of said aromatic aldehyde has six carbon atoms.

6. The process of claim 2 in which the copolymeric composition has a molecular weight of at least 500 and the said cyclic ether is a saturated aliphatic monoepoxide having from two to six carbon atoms and said aldehyde is a lower aliphatic monoaldehyde having from one to six carbon atoms and from zero to three halogen substituents selected from the group consisting of chloro and bromo radicals, and said anhydride is a cyclic monoanhydride.

7. The process of claim 6 in which the said aldehyde is formaldehyde.

8. The process of claim 6 in which the said aldehyde is acetaldehyde.

9. The process of claim 6 in which the said aldehyde is chloral.

10. The process of claim 6 in which the said aldehyde is bromal.

11. The process of claim 6 in which the said aldehyde is an ethylenically unsaturated lower aliphatic monoaldehyde.

12. The process of claim 6 in which the starter is water.

13. The process of claim 6 in which the starter is an inorganic hydrogen-containing acid capable of effecting the ring-opening reaction of said cyclic ether and said anhydride.

14. The process of claim 13 in which the starter is selected from the group consisting of phosphoric acid and phosphorous acid.

15. The process of claim 6 in which the starter is an organic compound having at least one radical selected from the group consisting of hydroxyl, carboxyl, and sulfhydryl radicals.

16. The process of claim 15 in which the said monoepoxide is selected from the group consisting of ethylene oxide, propylene oxide, 1,2-butylene oxide, and epichlorohydrin, and the said cyclic anhydride is selected from the group consisting of phthalic anhydride, 3,4,5,6-tetrachlorophthalic anhydride, 3,4,5,6-tetrabromophthalic anhydride, 3,4,5,6-tetrahydrophthalic anhydride, maleic anhydride, itaconic anhydride, succinic anhydride, 1,4,5,6,7-hexachlorobicyclo - (2,2,1) - 5-heptene-2,3-dicarboxylic acid anhydride, diphenic anhydride, and trimellitic anhydride, and the said starter is selected from the group consisting of ether polyols of from 4 to 18 carbon atoms and aliphatic alcohols having from 1 to 18 carbon atoms and from 1 to 8 hydroxyl groups.

17. The process of claim 15 in which the said monoepoxide is selected from the group consisting of ethylene oxide, propylene oxide, 1,2-butylene oxide, and epichlorohydrin, and the said cyclic anhydride is selected from the group consisting of phthalic anhydride, 3,4,5,6-tetrachlorophthalic anhydride, 3,4,5,6-tetrabromophthalic anhydride, 3,4,5,6-tetrahydrophthalic anhydride, 1,4,5,6,7-hexachlorobicyclo - (2,2,1) - 5-heptene-2,3-dicarboxylic acid anhydride, diphenic anhydride, trimellitic anhydride, maleic anhydride, itaconic anhydride, and succinic anhydride, and said starter is selected from the group consisting of organic carboxylic acids having from 1 to 54 carbon atoms and from one to three carboxylic acid groups and hydroxylcarboxylic acids having from 2 to 18 carbon atoms, from 1 to 5 hydroxyl groups and from one to three carboxylic acid groups.

18. The process of claim 15 in which the said monoepoxide is selected from the group consitsing of ethylene oxide, propylene oxide, 1,2-butylene oxide, and epichlorohydrin, and the said cyclic anhydride is selected from the group consisting of phthalic anhydride, 3,4,5,6-tetrachlorophthalic anhydride, 3,4,5,6-tetrabromophthalic anhydride, 3,4,5,6-tetrahydrophthalic anhydride, 1,4,5,6,7-hexachlorobicyclo - (2,2,1) - 5-heptene-2,3-dicarboxylic acid anhydride, diphenic anhydride, trimellitic anhydride, maleic anhydride, itaconic anhydride, and succinic anhydride, and said starter is a saccharide.

19. The process of claim 18 in which said saccharide has from five to twelve carbon atoms and from four to eight hydroxyl groups.

20. The process of claim 19 in which said saccharide is dextrose.

21. The process of claim 6 in which the starter has from one to 24 carbon atoms and 1 to 6 sulfhydryl groups.

22. The process of producing polymeric compositions having a molecular weight of at least 500 and containing in the polymer chains a multiplicity of internal ester, ether and acetal linkages, said acetal linkages being present in sequence in the form of polyacetal blocks, which comprises reacting together at a temperature of about 70° C. to about 225° C. sufficient for the reactants to polymerize, and at a pressure at least equal to the vapor pressure of the system at the reaction temperature (1) a cyclic ether selected from the group consisting of epoxides and oxetanes having from 2 to ten carbon atoms and from 0 to 3 halogen substituents selected from the group consisting of chloro and bromo radicals, (2) an acid anhydride selected from the group consisting of the cyclic anhydrides and linear anhydrides of organic polycarboxylic acids having from 4 to 14 carbon atoms, and (3) a linear polyacetal derived from a lower aliphatic aldehyde having from one to six carbon atoms and from zero to three halogen substituents selected from the group consisting of bromo and chloro radicals, and being terminated with active hydrogen-containing end groups, the ratio of reactive cyclic ether groups in said cyclic ether to anhydride groups in said polycarboxylic acid anhydride ranging from about one-to-one, to about six-to-one, and the amount of said linear polyacetal varying from about one percent to 95 percent by weight of the total reactant mixture.

23. The process of claim 22 in which the said cyclic ether is a saturated, aliphatic monoepoxide having from two to six carbon atoms and said anhydride is a cyclic monoanhydride of an organic polycarboxylic acid having from 4 to 14 carbon atoms.

24. The process of claim 23 in which the said monoepoxide is selected from the group consisting of ethylene oxide, propylene oxide, 1,2-butylene oxide, and epichlorohydrin, and the cyclic anhydride is selected from the group consisting of phthalic anhydride, maleic anhydride, itaconic anhydride, succinic anhydride, 1,4,5,6,7-hexachlorobicyclo - (2,2,1) - 5-heptene-2,3-dicarboxylic acid anhydride, 3,4,5,6-tetrachlorophthalic anhydride, 3,4,5,6-tetrabromophthalic anhydride, 3,4,5,6 - tetrahydrophthalic anhydride, diphenic anhydride, and trimellitic anhydride.

25. The process of claim 24 in which the linear polyacetal is polyoxymethylene.

26. The process of claim 24 in which the linear polyacetal is polyacetaldehyde.

27. The process of claim 24 in which the linear polyacetal is polychloral.

28. The process of claim 24 in which the linear polyacetal is polybromal.

29. A thermoplastic random ternary copolymer having polymer chains carrying at one chain end terminal groups selected from the group consisting of hydroxyl and carboxylic acid radicals and being joined at the other chain end through linkages selected from the group consisting of ester, ether, acetal and amide linkages to a residue derived from a polymerization starter selected from the group consisting of water, ammonia, hydrogen-containing inorganic acids capable of effecting the ring-opening reaction of cyclic ethers and anhydrides, and organic compounds having at least one radical selected from the group consisting of hydroxyl, carboxyl, sulfhydryl, and amino radicals, and mixtures thereof, the said polymer chains being essentially composed of a multiplicity of (X) —O—R—, (Y) —O—C—R'—C—, and (Z) —O—CH—
         ‖      ‖                    |
         O      O                    R'' units wherein —O—R— is an oxyalkylene radical selected from the group consisting of 1,3-oxyalkylene radicals and 1,4-oxyalkylene radicals and R is an alkylene radical selected from the group consisting of 1,2-alkylene radicals and 1,3-alkylene radicals of from two to twenty carbon atoms and from 0 to 3 halogen substituents selected from the group consisting of chloro and bromo radicals, R' is a hydrocarbon radical of from two to twelve carbon atoms and from zero to six halogen substituents selected from the group consisting of chloro and bromo radicals, and R'' is selected from the group consisting of hydrogen and hydrocarbon radicals having from one to twelve carbon atoms and from zero to three halogen substituents selected from the group consisting of chloro and bromo radicals, said units being joined through ester, ether, and acetal linkages in a structural arrangement in which the said X and Z units occur in the polymer chains both individually and in multiple adjacent sequences to form runs, and said Y units occur individually separated by X and Z units, with the said starter residues amounting to from about 0.1 percent to about 50 percent by weight of the copolymer, the Z units amounting to about 5 to 75 percent by weight of the copolymer, and with the ratio of R to R' ranging from about 1.5 up to about 10.

30. The composition of claim 29 having a molecular weight of at least 500.

31. The composition of claim 29 having a molecular weight distribution such that the ratio of weight-average molecular weight to the number-average molecular weight is less than 1.5.

32. The composition of claim 30 in which R is a saturated aliphatic 1,2-alkylene radical of from two to ten carbon atoms and from zero to three halogen substituents selected from the group consisting of chloro and bromo radicals, and R'' is an aryl radical.

33. The composition of claim 32 in which R'' is a monocyclic aryl radical having six carbon atoms in the aryl ring.

34. The composition of claim 30 in which R is a saturated aliphatic 1,2-alkylene radical of from two to ten carbon atoms and from zero to three halogen substituents selected from the group consisting of chloro and bromo radicals and R'' is selected from the group consisting of hydrogen and lower aliphatic radicals having from one to six carbon atoms and from zero to three halogen substituents selected from the group consisting of chloro and bromo radicals 35. The composition of claim 34 in which R'' is hydrogen.

36. The composition of claim 34 in which R'' is methyl.

37. The composition of claim 34 in which R'' is trichloromethyl.

38. The composition of claim 34 in which R'' is tribromomethyl.

39. The composition of claim 34 in which R'' is an ethylenically unsaturated lower aliphatic hydrocarbon radical.

40. The composition of claim 34 in which the polymerization starter residue is selected from the group consisting of O, N, and anionic residues of hydrogen-containing inorganic acids.

41. The composition of claim 34 in which the polymerization starter residue is derived from an organic compound having at least one radical selected from the group consisting of hydroxyl, carboxyl, sulfhydryl, and amino radicals.

42. The composition of claim 41 in which the said 1,2- alkylene radical is selected from the group consisting of 1,2-ethylene, 1,2-propylene, 1,2-butylene, and 3-chloro-1,2-propylene, and R' is selected from the group consisting of 1,2-phenylene, 3,4,5,6-tetrachloro-1,2-phenylene, 3,4,5,6 - tetrabromo-1,2-phenylene, 3,4,5,6-tetrahydro-1,2-phenylene, 1,2-ethenylene, 1-methylene-1,2-ethylene, 1,2-ethylene, hexachlorobicycloheptenylene, 2,2'-diphenylene, and 4-carboxy-1,2-phenylene, and the said starter is selected from the group consisting of ether polyols of from 4 to 18 carbon atoms and aliphatic alcohols having from 1 to 18 carbon atoms and from 1 to 8 hydroxyl groups.

43. The composition of claim 41 in which the said 1,2-alkylene radical is selected from the group consisting of 1,2-ethylene, 1,2-propylene, 1,2-butylene, and 3-chloro-1,2-propylene, and R' is selected from the group consisting of 1,2-phenylene, 3,4,5,6-tetrachloro-1,2-phenylene, 3,4,5,6-tetrabromo-1,2-phenylene, 3,4,5,6-tetrahydro-1,2-phenylene, 1,2-ethenylene, 1-methylene-1,2-ethylene, 1,2-ethylene, hexachlorobicycloheptenylene, 2,2'-diphenylene, and 4-carboxy-1,2-phenylene, and the said starter is selected from the group consisting of organic carboxylic acids having from 1 to 54 carbon atoms and from one to three carboxylic acid groups and hydroxyl carboxylic acids having from 2 to 18 carbon atoms, from 1 to 5 hydroxyl groups and from one to three carboxylic acid groups.

44. The composition of claim 41 in which the said 1,2-alkylene radical is selected from the group consisting of 1,2-ethylene, 1,2-propylene, 1,2-butylene, and 3-chloro-1,2-propylene, and R' is selected from the group consisting of 1,2-phenylene, 3,4,5,6-tetrachloro-1,2-phenylene, 3,4,5,6 - tetrabromo-1,2-phenylene, 3,4,5,6-tetrahydro-1,2-phenylene, 1,2-ethenylene, 1-methylene-1,2-ethylene, 1,2-ethylene, hexachlorobicycloheptenylene, 2,2'-diphenylene, and 4-carboxy-1,2-phenylene, and the said starter is a saccharide.

45. The composition of claim 41 in which the said 1,2-alkylene radical is selected from the group consisting of 1,2-ethylene, 1,2-propylene, 1,2-butylene, and 3-chloro-1,2-propylene, and R' is selected from the group consisting of 1,2-phenylene, 3,4,5,6-tetrachloro-1,2-phenylene, 3,4,5,6-tetrabromo-1,2-phenylene, 3,4,5,6-tetrahydro-1,2-phenylene, 1,2-ethenylene, 1-methylene-1,2-ethylene, 1,2-ethylene, hexachlorobicycloheptenylene, 2,2'-diphenylene, and 4-carboxy-1,2-phenylene, and the said starter has from one to 24 carbon atoms and from 1 to 6 sulfhydryl groups.

46. A thermoplastic fusible ternary block copolymer having end groups selected from the group consisting of OH and COOH radicals and having the formula $$E—A—B—A—E$$

where E is the terminal radical, A is a polyester-ether binary copolymer block of the formula

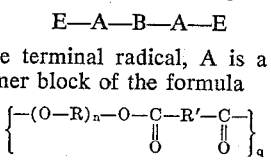

with R being an alkylene radical selected from the group consisting of 1,2-alkylene radicals and 1,3-alkylene radicals having from two to twenty carbon atoms and from zero to three halogen substituents selected from the group consisting of chloro and bromo radicals, R' is a hydrocarbon radical of from two to twelve carbon atoms and from zero to six halogen substituents selected from the group consisting of chloro and bromo radicals, $n$ is a positive whole number varying from one to about fifteen with the average value of $n$ varying from about 1.5 up to about ten, and $q$ is a positive whole number varying from one to fifty, and B is a polyacetal block of the structure

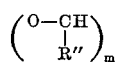

with R'' being selected from the group consisting of hydrogen and hydrocarbon radicals having from one to twenty carbon atoms and from zero to three halogen substituents selected from the group consisting of chloro and bromo radicals and $m$ is a positive whole number varying from five to 500, said A blocks constituting from about 5 to about 95 percent by weight of the ternary copolymer, said ternary copolymer having a molecular weight of at least 500.

47. The composition of claim 46 wherein R is a 1,2-alkylene radical of from two to six carbon atoms and from zero to three halogen substituents selected from the group consisting of chloro and bromo radicals.

48. The composition of claim 47 wherein R is selected from the group consisting of 1,2-ethylene, 1,2-propylene, and 1,2-butylene and R' is selected from the group consisting of 1,2-ethylene, 1,2-ethenylene, 1-methyl-1,2-ethylene, 1,2 - phenylene, 3,4,5,6-tetrachloro-1,2-phenylene, 3,4,5,6 - tetrabromo-1,2-phenylene, 3,4,5,6-tetrahydro-1,2-phenylene, 1,2 - ethylene, hexachlorobicycloheptenylene, and 2,2'-diphenylene.

49. The composition of claim 48 in which R'' is hydrogen.

50. The composition of claim 48 in which R'' is lower alkyl.

51. The composition of claim 48 in which R'' is trichloromethyl.

52. The composition of claim 48 in which R'' is tribromomethyl.

53. A thermoset, infusible random ternary copolymer consisting essentially of polymer chains carrying at one chain end terminal groups selected from the group consisting of hydroxyl and carboxylic acid radicals and being joined at the other chain end through linkages selected from the group consisting of ester, ether, acetal and amide linkages to a residue derived from a polymerization starter selected from the group consisting of water, ammonia, inorganic acids capable of effecting the ring-opening reaction of cyclic ethers and anhydrides, and organic compounds having at least one radical selected from the group consisting of hydroxyl, carboxyl, sulfhydryl, and amino radicals, and mixtures thereof, the said polymer chains being essentially composed of a multiplicity of (X) —O—R—,

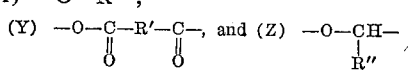

units wherein —O—R— is an oxyalkylene radical selected from the group consisting of 1,3-oxyalkylene radicals and 1,4-oxyalkylene radicals and R is an alkylene radical selected from the group consisting of 1,2-alkylene radicals and 1,3-alkylene radicals of from two to twenty carbon atoms and from 0 to 3 halogen substituents selected from the group consisting of chloro and bromo radicals, R' is a hydrocarbon radical of from two to twelve carbon atoms and from zero to six halogen substituents selected from the group consisting of chloro and bromo radicals, and R'' is selected from the group consisting of hydrogen and hydrocarbon radicals having from one to twelve carbon atoms and from zero to three halogen substituents selected from the group consisting of chloro and bromo radicals, said units being joined through ester, ether, and acetal linkages in a structural arrangement in which the said X and Z units occur in the polymer chains both individually and in multiple adjacent sequences to form runs, and said Y units occur individually separated by X and Z units, with the said starter residues amounting to from about 0.1 percent to about 50 percent by weight of the copolymer, the Z units amounting to about 5 to 75 percent by weight of the copolymer, and with the ratio of R to R' ranging from about 1.5 up to about 10, and with the said polymer chains being cross-linked through polyfunctional units having a functionality of at least 4 and being selected from the said X, Y, and Z units, with the weight fraction of the said polyfunctional units amounting to at least about 2 percent by weight of the total composition.

54. A thermoset, infusible ternary copolymer having end groups selected from the group consisting of OH and COOH radicals and having chains of the formula

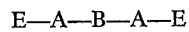

where E is the terminal radical, A is a polyester-ether binary copolymer block of the formula

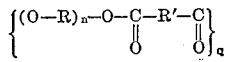

with R being an alkylene radical selected from the group consisting of 1,2-alkylene radicals and 1,3-alkylene radicals having from two to twenty carbon atoms and from zero to three halogen substituents selected from the group consisting of chloro and bromo radicals, R' is a hydrocarbon radical of from two to twelve carbon atoms and from zero to six halogen substituents selected from the group consisting of chloro and bromo radicals, $n$ is a positive whole number varying from one to about fifteen with the average value of $n$ varying from about 1.5 up to about ten, and $q$ is a positive whole number varying from one to fifty, and B is a polyacetal block of the structure

with R" being selected from the group consisting of hydrogen and hydrocarbon radicals having from one to twenty carbon atoms and from zero to three halogen substituents selected from the group consisting of chloro and bromo radicals and $m$ is a positive whole number varying from five to 500, said A blocks constituting from about 5 to about 95 percent by weight of the ternary copolymer, and with the said polymer chains being cross-linked through polyfunctional units having a functionality of at least 4 and being selected from the said R and R' radicals, with the weight fraction of the said polyfunctional units amounting to at least about 2 percent by weight of the total composition.

55. The process of producing ternary copolymeric compositions containing a multiplicity of ester, ether and acetal units in substantially random distribution in the polymer chains, which comprises reacting together in a closed system at a temperature of about 70° C. to 225° C. (1) a cyclic ether selected from the group consisting of epoxides and oxetanes, (2) a cyclic anhydride of an organic polycarboxylic acid having from four to fourteen carbon atoms and from zero to six halogen substituents selected from the group consisting of chloro and bromo radicals, (3) an aldehyde, and (4) from 0 to 50 percent by weight of the total reactant mixture of a polymerization starter selected from the group consisting of water, ammonia, hydrogen-containing inorganic acids capable of effecting the ring-opening reaction of said (1) and (2), and organic compounds having at least one radical selected from the group consisting of hydroxyl, carboxyl, sulfhydryl, and amino radicals, and mixtures thereof, the ratio of mols of reactive cyclic ether groups in said cyclic ether to mols of anhydride groups in said polycarboxylic acid anhydride ranging from one-to-one to about ten-to-one, and the amount of aldehyde varying from about one percent to about 99 percent by weight of the total reactant mixture.

56. The process of claim 55 in which the said cyclic ether is a monoether having from two to ten carbon atoms and from zero to three substituents selected from the group consisting of chloro and bromo radicals, the said aldehyde is a monomeric aldehyde of from one to 12 carbon atoms and from zero to three halogen substituents selected from the group consisting of chloro and bromo radicals, and the said polymerization starter is present in an amount of from 0.2 percent to 50 percent by weight of the total reactant mixture.

57. A polyurethane composition comprising the reaction product of (1) an organic polyisocyanate and (2) a hydroxyl-terminated thermoplastic terpolymer selected from the group consisting of the hydroxyl-terminated compositions of claim 32.

58. A polyurethane composition comprising the reaction product of (1) an organic polyisocyanate and (2) a hydroxyl-terminated thermoplastic terpolymer selected from the group consisting of the hydroxyl-terminated compositions of claim 34.

59. A polyurethane composition comprising the reaction product of (1) an organic polyisocyanate and (2) a hydroxyl-terminated thermoplastic terpolymer selected from the group consisting of the hydroxyl-terminated compositions of claim 46.

60. A cross-linked composition comprising the reaction product of (1) a free-radically reactive vinyl monomer and (2) a free-radically reactive unsaturated thermoplastic terpolymer selected from the group consisting of the free-radically reactive unsaturated thermoplastic compositions of claim 32.

61. A crosslinked composition comprising the reaction product of (1) a free-radically reactive vinyl monomer and (2) a free-radically reactive unsaturated thermoplastic terpolymer selected from the group consisting of the free-radically reactive unsaturated thermoplastic compositions of claim 34.

62. A cross-linked composition comprising the reaction product of (1) a free-radically reactive vinyl monomer and (2) a free-radically reactive unsaturated thermoplastic terpolymer selected from the group consisting of the free-radically reactive unsaturated thermoplastic compositions of claim 46.

References Cited

UNITED STATES PATENTS

| | | | |
|---|---|---|---|
| 3,326,857 | 6/1967 | Kawasumi et al. | 260—67 |
| 3,000,860 | 9/1961 | Brown et al. | 260—67 |
| 3,046,249 | 7/1962 | Hermann et al. | 260—67 |
| 3,213,067 | 10/1965 | Phol et al. | 260—78.4 |
| 3,219,630 | 11/1965 | Sidi | 260—67 |
| 3,254,060 | 5/1966 | Connolly et al. | 260—78.4 |
| 3,293,218 | 12/1966 | Sidi | 260—67 |
| 3,293,222 | 12/1966 | Sidi | 260—67 |

DONALD E. CZAJA, *Primary Examiner.*

R. W. GRIFFIN, *Assistant Examiner.*